(12) United States Patent
Stauffer et al.

(10) Patent No.: US 11,067,472 B2
(45) Date of Patent: Jul. 20, 2021

(54) DYNAMIC VACUUM DECAY LEAK DETECTION METHOD AND APPARATUS

(71) Applicant: PACKAGING TECHNOLOGIES & INSPECTION, LLC, Hawthorne, NY (US)

(72) Inventors: Oliver Stauffer, Tuckahoe, NY (US); Anton Stauffer, Morges (CH)

(73) Assignee: PACKAGING TECHNOLOGIES & INSPECTION, LLC, Hawthorne, NY (US)

(*) Notice: Subject to any disclaimer, the term of this patent is extended or adjusted under 35 U.S.C. 154(b) by 181 days.

(21) Appl. No.: 16/474,466

(22) PCT Filed: Dec. 27, 2017

(86) PCT No.: PCT/US2017/068608
§ 371 (c)(1),
(2) Date: Jun. 27, 2019

(87) PCT Pub. No.: WO2018/125946
PCT Pub. Date: Jul. 5, 2018

(65) Prior Publication Data
US 2019/0339157 A1 Nov. 7, 2019

Related U.S. Application Data

(60) Provisional application No. 62/439,279, filed on Dec. 27, 2016.

(51) Int. Cl.
*G01M 3/32* (2006.01)
*G01M 3/02* (2006.01)
*G01M 3/26* (2006.01)

(52) U.S. Cl.
CPC ............ *G01M 3/3281* (2013.01); *G01M 3/02* (2013.01); *G01M 3/26* (2013.01); *G01M 3/32* (2013.01); *G01M 3/3218* (2013.01)

(58) Field of Classification Search
CPC ............ G01M 3/02; G01M 3/26; G01M 3/32; G01M 3/3218; G01M 3/3263; G01M 3/3272; G01M 3/329
(Continued)

(56) References Cited

U.S. PATENT DOCUMENTS 2,784,373 A * 3/1957 Lawrance ............. G01M 3/329
324/461
2,855,777 A * 10/1958 Sherid ..................... G01M 3/34
73/40
(Continued)

FOREIGN PATENT DOCUMENTS

JP 58034337 A * 2/1983 ............. G01M 3/329

OTHER PUBLICATIONS

Extended European Search Report in European Patent Application No. 17886414.6, dated Jul. 9, 2020 (13 pages).
(Continued)

*Primary Examiner* — David A. Rogers
(74) *Attorney, Agent, or Firm* — Benesch, Friedlander, Coplan & Aronoff LLP

(57) ABSTRACT

A method and system of testing for package leaks by a test system is disclosed. The test system includes a vacuum source and a test chamber in which a package is received for testing. A package is placed in the test chamber, and a vacuum is drawn on the test chamber by the vacuum source. A predetermined pressure level in the test system is detected, and based upon the detection of the predetermined pressure level, the test system determines when to stop drawing the vacuum. The test chamber is isolated from the vacuum source based upon the determination, and subsequently the test system detects the presence or absence of a leak in the package based on pressure measurements in the test chamber. A timer may be used to determine the delay in isolating
(Continued)

the test chamber from the vacuum source after detection of the predetermined pressure level.

15 Claims, 6 Drawing Sheets

(58) Field of Classification Search
USPC .................................................. 73/40–49.8
See application file for complete search history.

(56) References Cited

U.S. PATENT DOCUMENTS

| | | | | |
|---|---|---|---|---|
| 3,800,586 | A * | 4/1974 | Delatorre | G01M 3/3236 73/49.2 |
| 4,272,985 | A * | 6/1981 | Rapson, Jr. | G01M 3/3236 73/49.2 |
| 4,320,653 | A * | 3/1982 | Bernhardt | G01M 3/34 73/40 |
| 4,409,817 | A * | 10/1983 | Edwards, Jr. | G01M 3/226 73/40.7 |
| 4,587,619 | A | 5/1986 | Converse, III et al. | |
| 4,831,870 | A * | 5/1989 | Smith | G01M 3/04 73/40.7 |
| 4,899,574 | A | 2/1990 | Potteiger | |
| 5,111,684 | A | 5/1992 | Stauffer | |
| 5,170,660 | A * | 12/1992 | Lehmann | B07C 5/3408 73/49.3 |
| 5,199,296 | A * | 4/1993 | Lehmann | G01M 3/329 73/45.4 |
| 5,235,845 | A * | 8/1993 | Ito | G01M 3/34 73/40 |
| 5,239,859 | A * | 8/1993 | Lehmann | B07C 5/3408 73/49.2 |
| 5,513,516 | A * | 5/1996 | Stauffer | G01M 3/3218 73/49.2 |
| 5,847,264 | A * | 12/1998 | Martin | G01M 3/3236 73/40 |
| 5,907,093 | A * | 5/1999 | Lehmann | G01M 3/329 73/49.3 |
| 6,003,363 | A * | 12/1999 | Danielson | G01M 3/06 73/49.2 |
| 6,082,184 | A * | 7/2000 | Lehmann | G01M 3/3281 73/49.3 |
| 6,286,362 | B1 * | 9/2001 | Coffman | G01M 3/202 73/40.7 |
| 6,305,215 | B2 * | 10/2001 | Lehmann | G01M 3/3281 73/40 |
| 6,513,366 | B1 * | 2/2003 | Stauffer | G01M 3/329 73/49.3 |
| 6,526,809 | B2 * | 3/2003 | McCoy | G01M 3/224 73/49.3 |
| 6,662,634 | B2 * | 12/2003 | Lehmann | G01M 3/3281 73/1.62 |
| 7,290,440 | B2 * | 11/2007 | Gocho | G01M 3/2815 73/49.2 |
| 7,584,650 | B2 * | 9/2009 | Lehmann | G01M 3/36 73/45.4 |
| 7,788,967 | B2 * | 9/2010 | Golding | G01M 3/226 73/40.5 A |
| 7,818,133 | B2 * | 10/2010 | Furuse | G01M 3/3263 702/51 |
| 8,459,099 | B2 * | 6/2013 | Lehmann | B65B 3/04 73/49.3 |
| 8,544,315 | B2 * | 10/2013 | Guazzo | G01M 3/3281 73/40.7 |
| 8,975,576 | B2 * | 3/2015 | Lehmann | G01M 3/329 250/282 |
| 9,038,440 | B2 * | 5/2015 | Yaberg | G01M 3/34 73/40 |
| 10,234,356 | B2 * | 3/2019 | Kaneko | B60K 15/03504 |
| 10,401,255 | B1 * | 9/2019 | Chamberlain | G01M 3/205 |
| 10,646,732 | B2 * | 5/2020 | Rachapudi | A62B 27/00 |
| 10,697,850 | B2 * | 6/2020 | Schindler | G01M 3/329 |
| 2001/0042399 | A1 * | 11/2001 | Dawson | F02M 25/0809 73/49.7 |
| 2002/0000117 | A1 * | 1/2002 | McCoy | G01M 3/224 73/49.3 |
| 2004/0182136 | A1 * | 9/2004 | Halla | B67D 7/3209 73/49.2 |
| 2008/0081000 | A1 * | 4/2008 | MacLeod | G01M 3/329 422/68.1 |
| 2008/0127716 | A1 * | 6/2008 | Eliasson | G01M 3/363 73/45.4 |
| 2011/0000282 | A1 * | 1/2011 | Cournoyer | G01M 3/3263 73/40 |
| 2011/0100095 | A1 * | 5/2011 | Cournoyer | G01M 3/3263 73/40 |
| 2011/0174060 | A1 | 7/2011 | Guazzo et al. | |
| 2012/0291457 | A1 * | 11/2012 | Brown | G01M 3/3227 62/77 |
| 2014/0130578 | A1 * | 5/2014 | Kenney | G01M 3/32 73/49.2 |
| 2016/0116365 | A1 * | 4/2016 | Luedolph | G01M 3/202 73/40.7 |
| 2016/0334298 | A1 * | 11/2016 | Hilpert | E21B 36/00 |
| 2018/0259421 | A1 * | 9/2018 | Schindler | G01M 3/3254 |

OTHER PUBLICATIONS

International Search Report for PCT/US2017/068608, dated Mar. 9, 2018.

* cited by examiner

DYNAMIC VACUUM DECAY LEAK DETECTION METHOD AND APPARATUS

CROSS-REFERENCE TO RELATED APPLICATIONS

This application claims the benefit of U.S. Provisional Patent Application No. 62/439,279, filed Dec. 27, 2016, which is hereby incorporated by reference in its entirety.

FIELD OF THE INVENTION

The present invention pertains to the art of testing the integrity of seals associated with various packaging or containers. Particularly, the present invention is directed to using a dynamic vacuum decay method and control system for detecting a leak in a package.

BACKGROUND

Flexible package leak testing is often performed using the vacuum decay test method. Vacuum is drawn on a package in a test chamber and the vacuum level is monitored. For flexible packaging the use of a flexible membrane is often used. Testing low headspace packaging is often challenging, as the air within a low volume package can be evacuated before a leak can be detected.

In order to detect leaks in a low volume flexible package, the test must be performed such that the internal volume of the package is not completely evacuated before the test measurement occurs. If vacuum is not pulled effectively on the test chamber, it is possible that all air could be evacuated from a package and the defect could go undetected. Thus, large leaks in a low headspace package may not be detected.

With reference to FIG. 1, the traditional vacuum decay pulls vacuum until a timer has been triggered or a vacuum level has been reached. In test methods that use a specific timer, a package that is defective can bleed all the air out during the evacuation cycle (FIG. 1, correct positive) and there is no more air to leak out. A package that may be non-leaking but requires more time for the test chamber to be evacuated would not reach vacuum in the allotted time, and may even be detected as a leak (FIG. 1, false negative). Non-dynamic filling based on a timer is not reliable in pulling vacuum to the target vacuum level and detecting critical leaks while passing good samples.

The general approach of pulling vacuum until the target vacuum level is reached is also not reliable as the large leaks will have leaked the air out during the evacuation cycle while also slowing down the evacuation process. Once the target vacuum level is reached, the defect has no air remaining inside and there is no leak that can be measured.

SUMMARY

Embodiments of the present invention are directed to a vacuum leak test operated using a vacuum decay control system and a test chamber. The present invention is directed to a method and testing apparatus for detecting even sub-visible leaks in non-porous containers including, but not limited to, chemical and/or medicinal containing vials, pouches, blister packs, ampoules, syringes, injection cartridges and ophthalmic packages. In a method of the invention, a partially or completely filled container is placed within a leak-tight and sealed test chamber. After the container is placed within the test chamber and the chamber sealed, a vacuum is pulled within the system plus the chamber by a vacuum pump, with the vacuum level being monitored through a series of sequential test periods using a pressure transducer. In order to improve leak detection and minimize incorrect test results, methods of the present invention provide a dynamic vacuum decay test method wherein vacuum decay in the test chamber is dynamically controlled using a timer in cooperation with a pressure feedback control system, such that isolation of the test chamber from the vacuum source is delayed based upon detection of a predetermined pressure level in conjunction with the timer.

In one embodiment of the present invention, a method of testing for package leaks by a test system that includes a vacuum source, a test chamber in which a package is received for testing, and a valve for selectively isolating the test chamber from the vacuum source, comprises placing a package in the test chamber, drawing a vacuum on the test chamber by the vacuum source, detecting a predetermined pressure level in the test system, based upon the detection of the predetermined pressure level, determining when to stop drawing the vacuum on the test chamber, isolating the test chamber from the vacuum source based upon the determination, and subsequently detecting the presence or absence of a leak in the package based on pressure measurements in the test chamber.

The method may further comprise determining when to stop drawing the vacuum by initiating a timer, and wherein the test chamber is isolated from the vacuum source after expiration of the timer. By way of example and not limitation, the timer may expire after 1 second. The test system may further include a microcontroller to monitor the pressure level and initiate the timer, wherein the microcontroller dynamically determines when to initiate the timer based on the measure pressure level. In some embodiments, the predetermined pressure level may be 700 mbar.

In some embodiments the test chamber may be, for example, a rigid test chamber or a flexible test chamber, and the container may be, for example, a flexible package, non-porous vial, ampoules injection cartridge, ophthalmic product package, syringe, pouch, blister package, and medicinal packaging.

In another embodiment of the present invention, a method of testing completely or partially liquid product filled or dry product filled rigid and semi-rigid nonporous containers for leaks, including headspace gas leaks and/or vapor leaks derived from package contents, using at least one pressure transducer in a testing system that includes a vacuum source and wherein the testing system may be selective isolated from a test chamber in which a container is received for testing, comprises the steps of step A) placing a container in an airtight test chamber and sealing the chamber, step B) maintaining a controlled vacuum pressure within the testing system prior to communicating the testing system to the test chamber, step C) initiating a test by connecting the testing system to the test chamber and drawing a vacuum on the test chamber utilizing the vacuum source, step D) upon reaching a target first determined pressure, initiating a delay timer in the testing system, step E) upon expiration of the delay timer, closing the vacuum source from the test chamber; and subsequently, and step F) monitoring any decay in the vacuum created in the test chamber using the pressure transducer to detect any increase in pressure within the test chamber such that increases in pressure may reflect a leak in the container.

In some embodiments, step C may be performed such that in a first period of time, if a first predetermined pressure is not achieved, the test is aborted but, if achieved, the test continues to step D. Further, for example, step C may be performed such if the first predetermined pressure is achieved, the test continues for a second period of time and if a second predetermined pressure is not achieved, the test is aborted; otherwise the test continues to step D.

In other embodiments, step C may be performed in at least two steps, such in a first period of time, the testing system in the controlled state is isolated from the vacuum source, then the testing system is connected to the test chamber while monitoring the pressure within the test chamber using the pressure transducer and aborting the testing if a first predetermined pressure is exceeded within a first predetermined period of time from the start of the test; otherwise the test continues by opening the vacuum source to the testing system and allowing the vacuum source to reduce the pressure in the test chamber to a predetermined vacuum utilizing the vacuum source while monitoring the pressure within the test chamber using the pressure transducer. For example, in step C, the test is aborted if a second predetermined pressure is not achieved within a second predetermined period of time, following the first period from the start of the test.

Some embodiments of a method of present invention may include the additional steps of closing the testing system to the test chamber while maintaining a vacuum pressure within the testing system and venting the test chamber if the first predetermined pressure is not reached within the first predetermined period of time. Further, the method may include the additional steps of closing the testing system to the test chamber while maintaining a vacuum pressure within the testing system and venting the test chamber after the monitoring of step F.

In some embodiments, for example, the predetermined pressure level may be 700 mbar, and/or the timer expires after 1 second. Additionally, the test system may include a microcontroller to monitor the pressure level measured by the pressure transducer and initiate the timer. For example, the microcontroller may dynamically determine when to initiate the timer based on the measure pressure level.

In some embodiments the test chamber may be, for example, a rigid test chamber or a flexible test chamber, and the container may be, for example, a flexible package, non-porous vial, ampoules injection cartridge, ophthalmic product package, syringe, pouch, blister package, and medicinal packaging.

Yet another embodiment of the present invention includes a system for testing for package leaks. The system may comprise a vacuum source connected to a test chamber via a conduit, a pressure regulator connected in the conduit between the vacuum source and the test chamber, a first valve connected in the conduit between the pressure regulator and the test chamber for selectively isolating the vacuum source from the conduit, a second valve connected in the conduit between the first valve and the test chamber for isolating the test chamber from the conduit, a pressure transducer connected to the conduit between the first valve and the second valve for measuring pressure in the test system, and a timer that is initiated when the pressure transducer detects a target vacuum level, wherein the first valve is closed to isolate the vacuum source from the conduit upon expiration of the timer.

It is an object of the present invention to provide a vacuum leak test operated using a vacuum decay control system and a test chamber. The leak test method may be deployed by a test controller system. The test controller can operate with a rigid test chamber or a flexible test chamber, although the use of a flexible test chamber is advantageous.

The target vacuum level, the trigger vacuum level, and the timers associated with the test may vary, but generally would not need modification due to the intelligent dynamic vacuum system. Embodiments of the leak test method consistent with the present invention may be deployed in conjunction with other vacuum test solutions.

It is an object of the present invention to provide distinct advantages and improvements to the vacuum decay leak detection of a wide variety of containers, and more particularly to the testing of containers filled with either dry product or liquid product such as non-porous vials, ampoules, injection cartridges, ophthalmic product packages, syringes, pouches, blister packages and other packages containing critical medicinal and/or chemical products. The use of the intelligent dynamic vacuum leak detection method of the present invention applies to the testing of containers using a method of dynamically controlling and measuring vacuum decay within a test chamber in which a container being tested is sealed and wherein as a vacuum is being pulled with the test chamber the pressure levels are continuously monitored, such that pressure conditions within the test chamber over a period of time are used to indicate passage or failure of a container being tested.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other aspects and features will become apparent from the following description with reference to the following figures, wherein like reference numerals refer to like parts throughout the various figures unless otherwise specified, and wherein.

DETAILED DESCRIPTION

Figure 1:
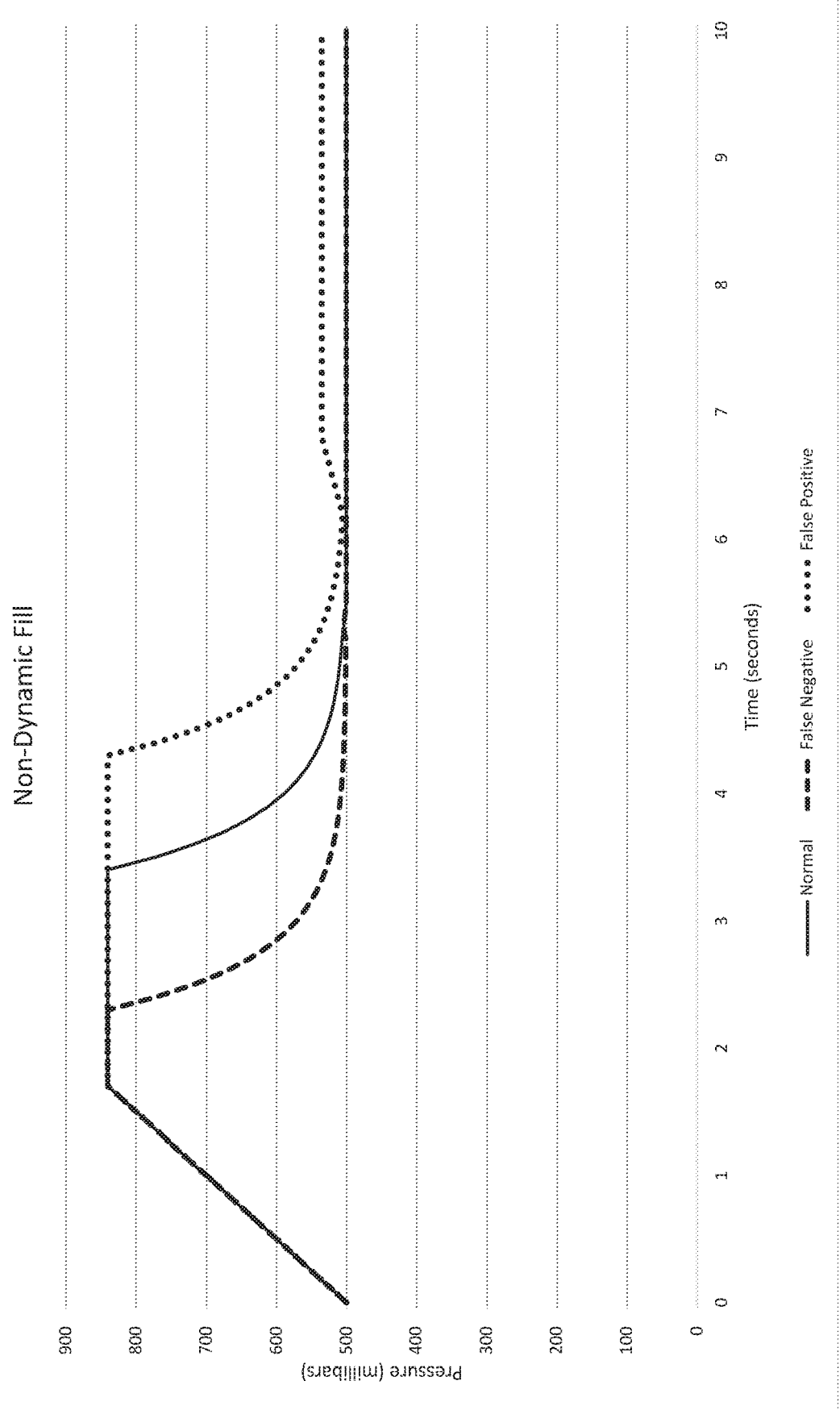
FIG. 1 is a graph of an exemplary package leak detection test using a conventional non-dynamic vacuum leak detection test method.
Figure 2:
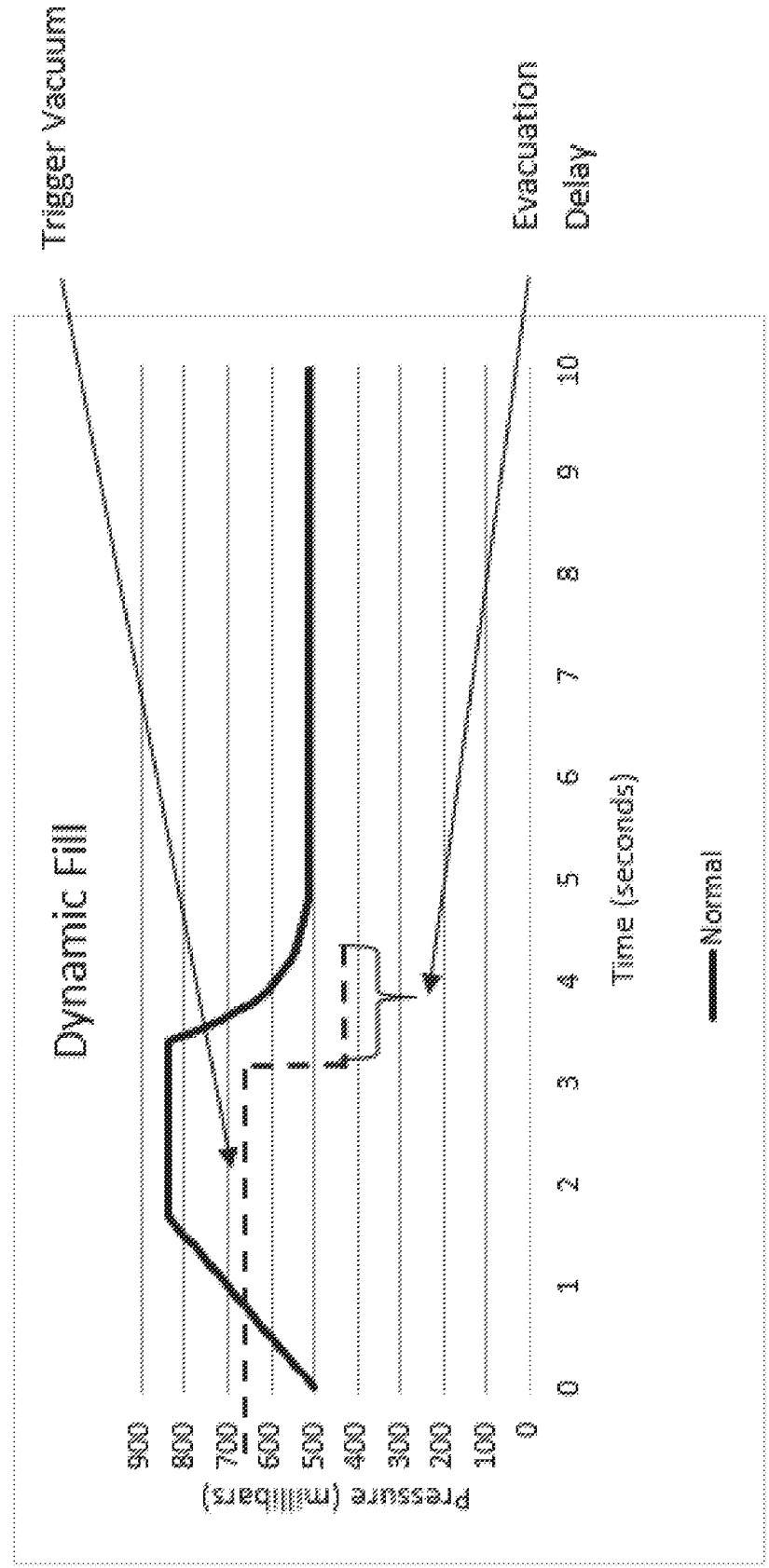
FIG. 2 is a graph of pressure in a test chamber over a period of seconds using dynamic vacuum leak detection test method consistent with the present invention.

The test system can either be at atmospheric pressure or at a controlled pressure. In the example depicted in FIG. 2, the test system is at a controlled vacuum of 500 mbar. The test chamber is closed. Once the test is initiated, vacuum is being drawn on the test chamber. When the vacuum is initially drawn on the chamber the vacuum reading remains stable between the target vacuum level and atmospheric pressure. As the vacuum level is being drawn on the chamber the test system is initially removing air volume and not building a vacuum level, and the vacuum remains at the vacuum plateau until air is evacuated. Once the air volume has generally been evacuated, the vacuum level will build quickly. On approaching the target vacuum level, the test system triggers a vacuum trigger, initiating an evacuation delay timer, upon passing through a specific pressure threshold, in this case the trigger pressure is 700 mbar and the timer is set to 1 second. Once the vacuum level passes through the trigger point, the timer will determine when to stop pulling vacuum on the chamber.

Figure 3:
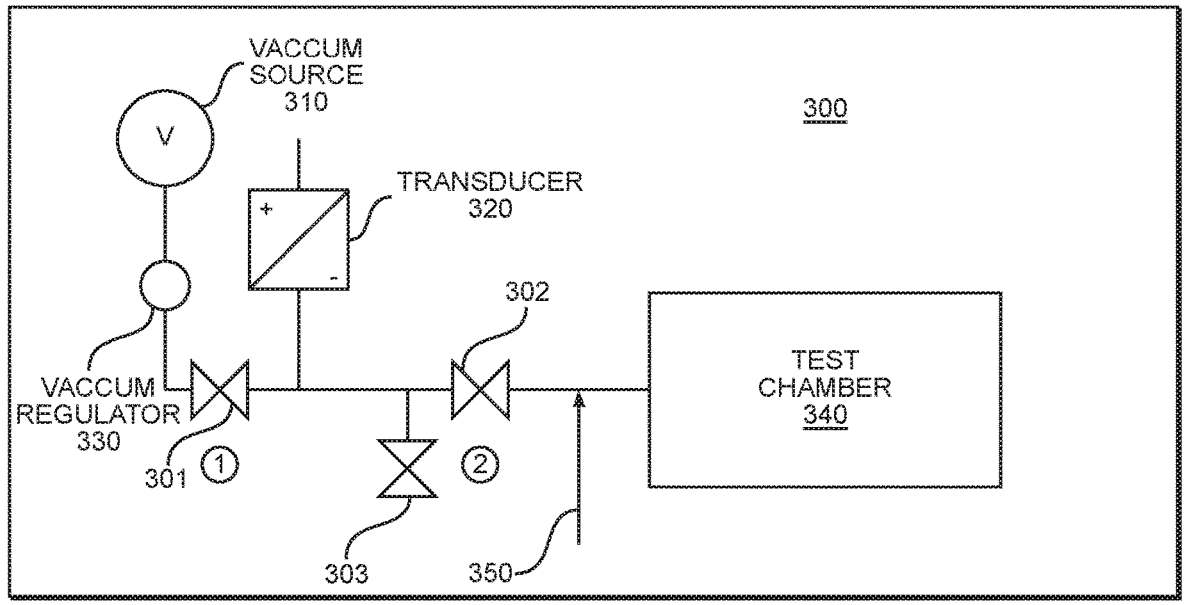
FIG. 3 is a diagram of a dynamic vacuum leak detection test system consistent with the present invention.

With reference to FIG. 3, a test system 300 in accordance with an embodiment of the present invention includes a vacuum source 310 and a test chamber 340 connected by a vacuum conduit 350. A vacuum regulator 330 is placed in the vacuum conduit 350 between the vacuum source 310 and a first valve 301 in the vacuum conduit 350. A second valve 302 is placed in the vacuum conduit 350 between the first valve 301 and the test chamber 340. A pressure transducer 320 is placed in communication with the vacuum conduit between the first valve 301 and the second valve 302. A third valve 303 for venting test system 300 is placed in communication with the vacuum conduit 350 between the first valve 301 and the second valve 302.

A computer including a timer (not shown) provides control signals to the vacuum source 310, the vacuum regulator 330, the first valve 301, the second valve 302, and the third valve 303, and receives a pressure signal from the pressure transducer 320 indicating pressure conditions in the test chamber 340.

Figure 4:
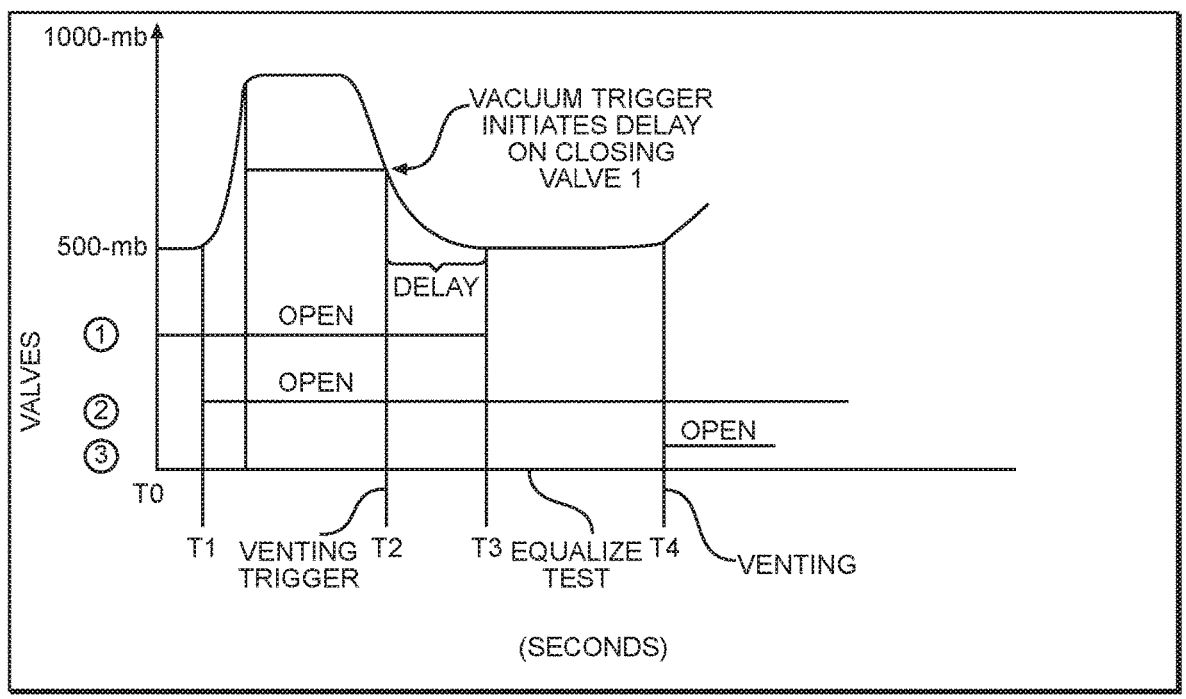
FIG. 4 illustrates a dynamic vacuum leak detection test method consistent with the present invention.

With reference to FIGS. 3 and 4, an example operation of the test system 300 is described. At time T0, the test system is at a controlled vacuum of 500 mbar, first valve 301 is open, second valve 302 is closed, and third valve 303 is closed. Once the test is initiated at time T1, the second valve 302 is opened and a regulated vacuum begins to be drawn on the test chamber 340 by vacuum source 310 via vacuum regulator 330 through vacuum conduit 350. When the vacuum is initially drawn on the test chamber 340, the vacuum reading remains stable between a target vacuum level and atmospheric pressure. As the vacuum level is being drawn on the test chamber 340, the test system 300 is initially removing air volume and not building a vacuum level, and the vacuum remains at a vacuum plateau until air is evacuated. Once the air volume has generally been evacuated, the vacuum level builds quickly. As the test system 300 approaches the target vacuum level, a specific pressure threshold designated a vacuum trigger is detected by the pressure transducer 320 at time T2, at which point a delay timer is initiated in the control computer. For example and without limitation, in this example the trigger pressure is 700 mbar and the timer is set to 1 second. Once the vacuum level passes through the trigger point, the timer will determine when to close first valve 301 at time T3 to isolate the vacuum source 310 from the test chamber 340, and thereby stop pulling vacuum on the chamber. The pressure transducer 320 then monitors the pressure in the test system to determine the existence of a leak in the package under test. Upon completion of the test, or otherwise aborting the test, the third valve 303 is opened to vent the test system 300 at time T4.

Figure 5:
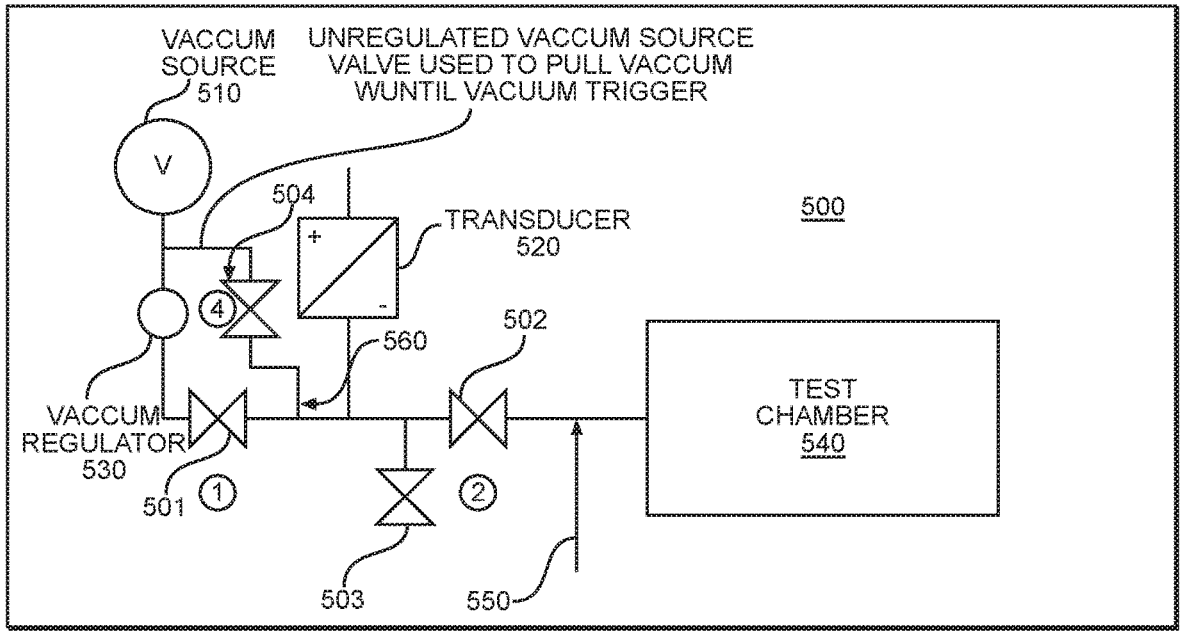
FIG. 5 is a diagram of an alternative dynamic vacuum leak detection test system consistent with the present invention.

With reference to FIG. 5, a test system 500 in accordance with the alternative embodiment of the present invention includes a vacuum source 510 and a test chamber 540 connected by a vacuum conduit 550. The vacuum regulator 530 is disposed in the vacuum conduit 550 between the vacuum source 510 and a first valve 501 in the vacuum conduit 550. A second valve 502 is placed in the vacuum conduit 550 between the first valve 501 and the test chamber 540. A pressure transducer 520 is placed in communication with the vacuum conduit between the first valve 501 and the second valve 502. A third valve 503 for venting test system 500 is placed in communication with the vacuum conduit 550 between the first valve 501 and the second valve 502. In the alternative embodiment, a fourth valve 504 is introduced to bypass the vacuum regulator 530 for enhanced vacuum flow.

Still referring to FIG. 5, the alternative embodiment is distinguished from the embodiment shown in FIG. 3 by proving an additional unregulated vacuum supply. A bypass conduit 560 is provided to bypass the vacuum regulator 510 and the first valve 501 by connecting the vacuum source 510 from point A of the vacuum conduit 550 to point B of the vacuum conduit 550 without passing through the vacuum regulator 530 and the first valve 501. A fourth valve 504 is placed in the bypass conduit 560 for controlling the bypass vacuum supply from point A to point B. Accordingly, the bypass conduit 560 provides an unregulated vacuum supply from point A to point B when the fourth valve 504 is open.

A microcomputer including a timer (not shown) provides control signals to the vacuum source 510, the vacuum regulator 530, the first valve 501, the second valve 502, the third valve 503, and the fourth valve 504, and receives a pressure signal from the pressure transducer 520 indicating pressure conditions in the test chamber 540.

Figure 6:
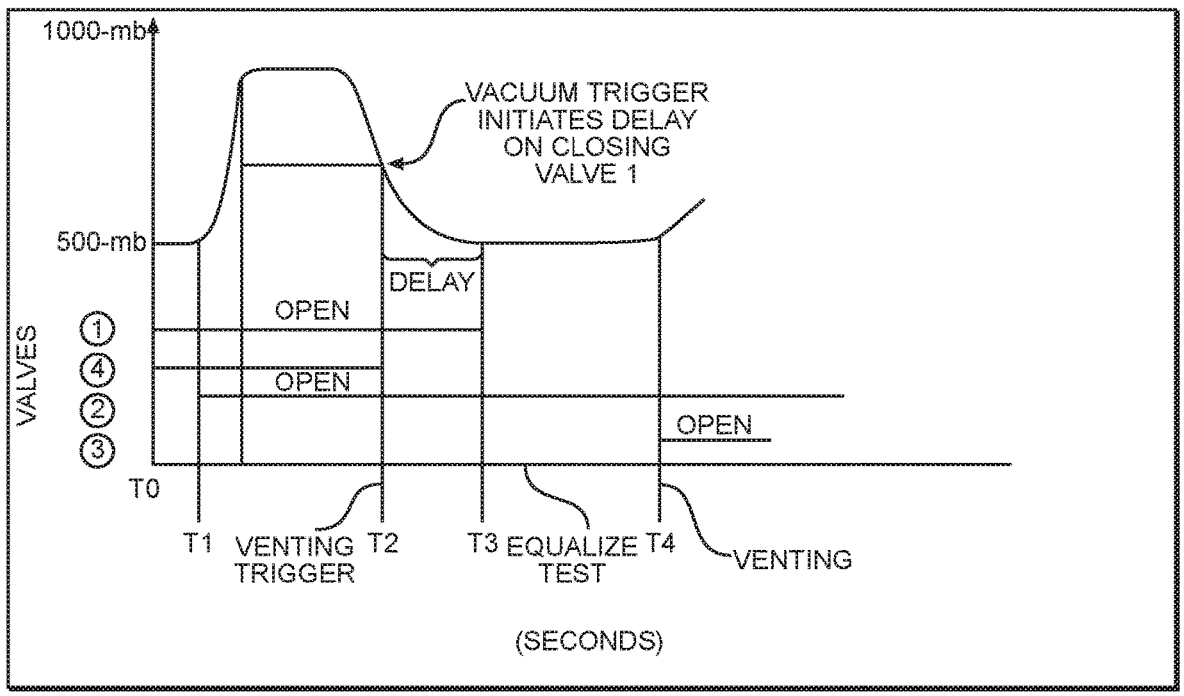
FIG. 6 illustrates an alternative dynamic vacuum leak detection test method consistent with the present invention.

With reference to FIGS. 5 and 6, an example operation of the test system 500 is described. At time T0, the test system is at a controlled vacuum of 500 mbar, the first valve 501 and the fourth 504 are open, and the second valve 502 and third valve 503 are closed. Once the test is initiated at time T1, the second valve 502 is opened and a vacuum begins to be drawn on the test chamber 540 by vacuum source 510. A regulated vacuum is drawn through the first valve 501 via vacuum regulator 530, and an unregulated vacuum is drawn through the fourth valve 504. When the vacuum is initially drawn on the test chamber 540, the vacuum reading remains stable between a target vacuum level and atmospheric pressure. As the vacuum level is being drawn on the test chamber 540, the test system 500 is initially removing air volume and not building a vacuum level, and the vacuum remains at a vacuum plateau until air is evacuated. Once the air volume has generally been evacuated, the vacuum level builds quickly. As the test system 500 approaches the target vacuum level, a specific pressure threshold designated a vacuum trigger is detected by the pressure transducer 520 at time T2, at which point a delay timer is initiated in the control computer and the fourth valve 504 offering the unregulated vacuum is closed. For example and without limitation, in this example the trigger pressure is 700 mbar and the timer is set to 1 second. Once the vacuum level passes through the trigger point, the first valve 501 offering regulated vacuum remains open, and the timer will determine the first valve 501 is closed at time T3 to isolate the vacuum source 510 from the test chamber 540, and thereby stop pulling vacuum on the chamber. The pressure transducer 520 then monitors the pressure in the test system to determine the existence of a leak in the package under test. Upon completion of the test, or otherwise aborting the test, the third valve 501 is opened to vent the test system 500.

Figure 7:
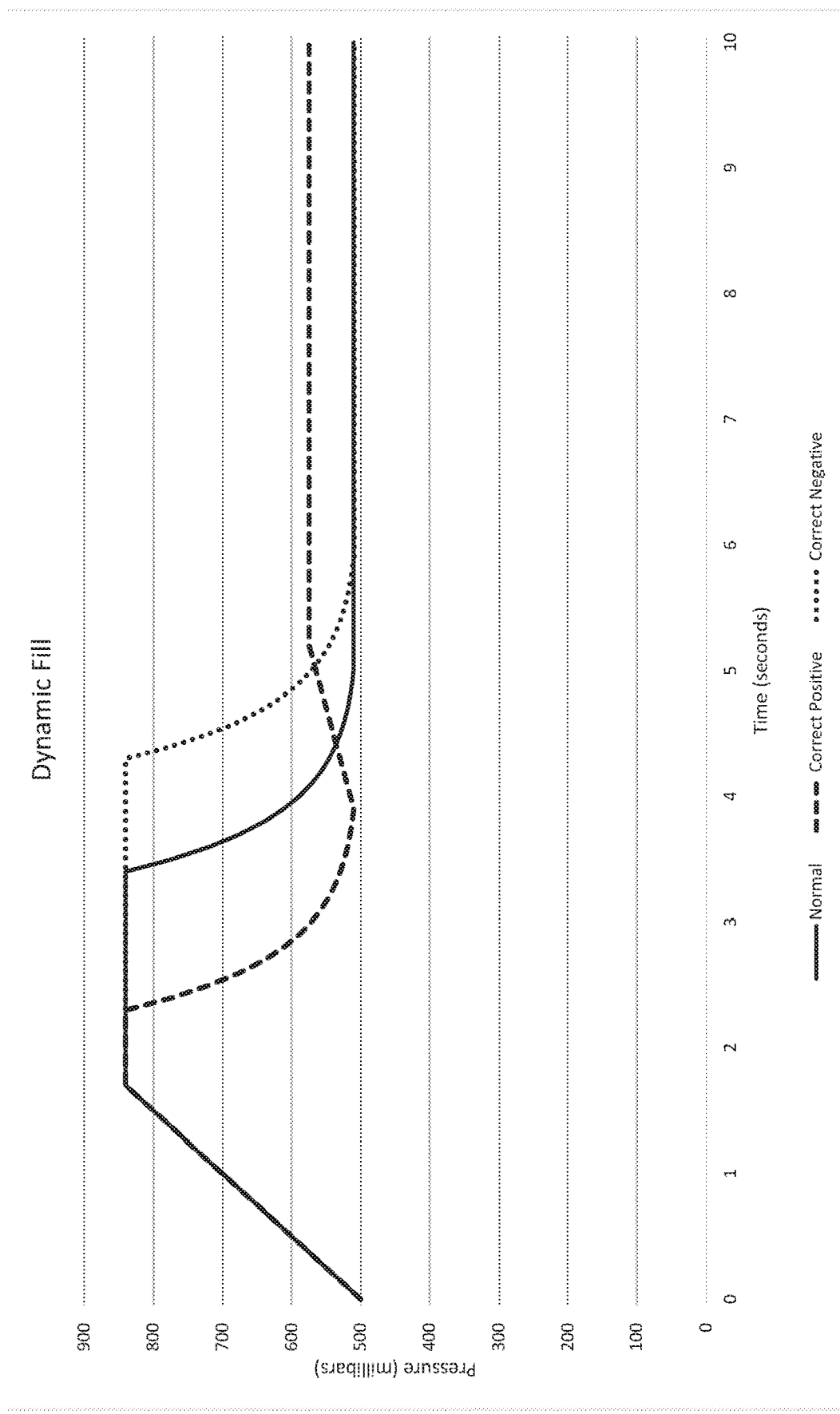
FIG. 7 is a graph of an exemplary package leak detection test using a dynamic vacuum leak detection test consistent with the present invention.

With reference to FIG. 7, when testing a package that has a large leak with the dynamic vacuum mode, the vacuum level in the test chamber will pass the trigger point, and upon the timer stopping the evacuation of the test chamber, a large leak in the package-under-test will cause a spike in pressure (FIG. 7, correct positive). The method reliably draws vacuum on pouches regardless of the time it takes to evacuate the general volume of the test chamber. A package that may be non-leaking but requires more time for the test chamber to be evacuated would not be detected as a leak (FIG. 7, correct negative).

Figure 8:
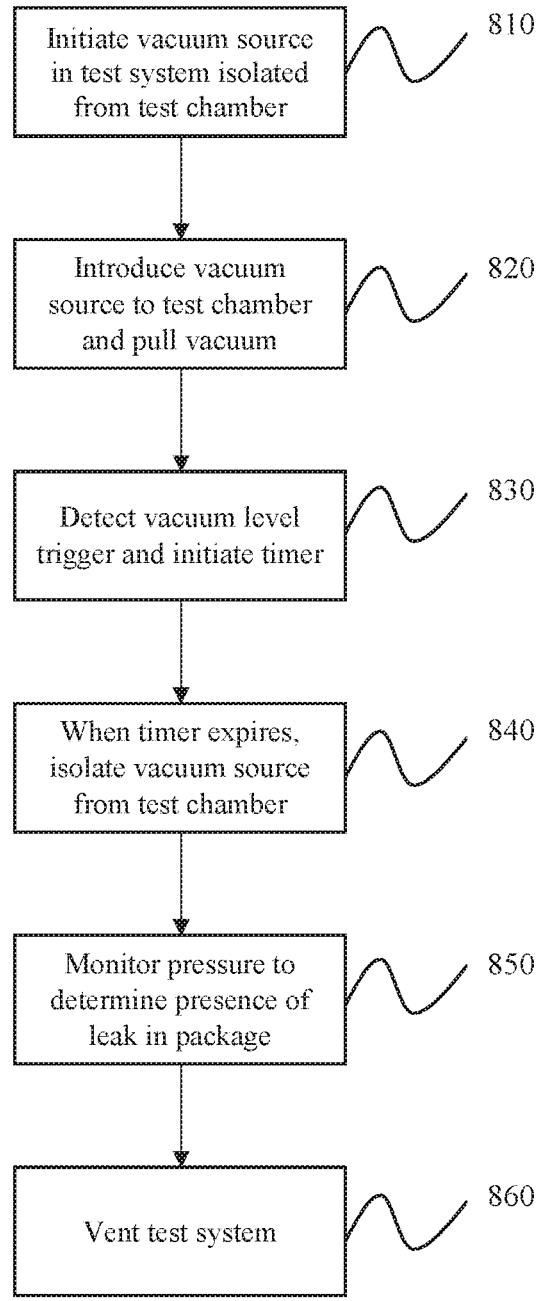
FIG. 8 is a flow diagram illustrating a dynamic vacuum decay leak detection method consistent with the present invention.

With reference to FIG. 8, a flow diagram is depicted to illustrate a dynamic vacuum decay leak detection method consistent with the present invention. Referring to FIG. 8, and FIGS. 3 and 5, a controlled vacuum level is established in the test system at step 810, prior to communicating the test system to the test chamber. Here, the first valve to selectively isolate the vacuum source is open, and the second valve to selectively isolate the test chamber from the test system is closed, such that the test chamber is isolated from the test system. At step 820, the second valve is opened such that the vacuum source of the test system is in communication with the test chamber, and the test system begins to pull vacuum on the test chamber. At step 830, a predetermined vacuum trigger is detected as vacuum in the test chamber begins to build, measured by the pressure transducer, and the detection of this vacuum trigger is fed back to a control system. Based on the detected vacuum trigger, the control system initiates the timer. By way of example and not limitation, the timer may be set to expire after 1 second. When the timer expires at step 840, the first valve is closed to isolate the vacuum source from the test chamber. At step 850, pressure between the test system and the test chamber is equalized, and pressure in the test system is monitored by the pressure transducer to determine the presence of a leak in the package under test. At step 860, the third valve is opened to vent the test system.

The present invention allows for a variety of package shapes and sizes to be placed into the test chamber with the same test parameters, and regardless of test chamber volume surrounding the package, it can provide an accurate vacuum evacuation. In doing so, large leaks can be detected on packages with low headspace and little volume surrounding the package. Simultaneously, a larger package format may be tested that requires a longer time to evacuate, and the system would dynamically be able to reach the appropriate vacuum level.

Embodiments of the present invention are directed to a vacuum leak test operated using a vacuum decay control system and a test chamber. The leak test method may be deployed by a test controller system. The test controller can operate with a rigid test chamber or a flexible test chamber, although the use of a flexible test chamber is advantageous. The target vacuum level, the trigger vacuum level, and the timers associated with the test may vary, but generally would not need modification due to the intelligent dynamic vacuum system. Embodiments of the leak test method consistent with the present invention may be deployed in conjunction with other vacuum test solutions.

The present invention offers distinct advantages to the vacuum decay leak detection of a wide variety of containers, and more particularly to the testing of containers filled with either dry product or liquid product such as non-porous vials, ampoules, injection cartridges, ophthalmic product packages, syringes, pouches, blister packages and other packages containing critical medicinal and/or chemical products. The use of the intelligent dynamic vacuum leak detection method of the present invention applies to the testing of containers using a method of dynamically controlling and measuring vacuum decay within a test chamber in which a container being tested is sealed and wherein as a vacuum is being pulled with the test chamber the pressure levels are continuously monitored, such that pressure conditions within the test chamber over a period of time are used to indicate passage or failure of a container being tested.

The foregoing description of the preferred embodiments of the invention has been presented to illustrate the principles of the invention and not to limit the invention to the particular embodiment illustrated. It will be appreciated by those skilled in the art that changes could be made to the embodiments described above without departing from the inventive concept thereof. Thus, it is intended that the scope of the invention be defined by all of the embodiments encompassed within the following claims and their equivalents. While the inventive concepts have been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A method of testing for package leaks by a test system that includes a vacuum source, a test chamber in which a package is received for testing, and a valve for selectively isolating the test chamber from the vacuum source, the method comprising:
   placing a package in the test chamber;
   evacuating air from the test chamber by the vacuum source;
   detecting a trigger pressure as the test system approaches a target pressure, wherein the trigger pressure is higher than the target pressure;
   initiating a timer by a microcontroller upon detecting the trigger pressure;
   isolating the test chamber from the vacuum source upon expiration of the timer; and
   subsequently initiating a test detecting the presence or absence of a leak in the package based on pressure measurements in the test system.

2. The method of claim 1, wherein the presence of a leak is detected when the pressure measurement is higher than the target pressure, and the absence of a leak is detected when the pressure measurement is no greater than the target pressure.

3. The method of claim 1, wherein the test chamber is a flexible test chamber.

4. The method of claim 1, further comprising a pressure transducer electronically connected to the microcontroller and used to measure pressure data in the test system, such that pressure data is collected in the test system and communicated to the microcontroller.

5. The method of claim 1, wherein the package is a flexible package.

6. The method of claim 1, wherein the trigger pressure is set between the target pressure and an evacuation pressure, the evacuation pressure is a plateauing pressure value upon evacuating air from the test chamber before the pressure measurement decreases.

7. The method of claim 1, further comprising maintaining a controlled vacuum pressure within the test system prior to communicating the test system to the test chamber.

8. The method of claim 1, wherein the presence of a leak is detected when a pressure spike is present in the pressure measurements.

9. The method of claim 1, wherein the package is at least one of a non-porous product package, a pouch, a blister package, or a medicinal package.

10. The method of claim 1, wherein the evacuating air from the test chamber comprises drawing a regulated vacuum.

11. The method of claim 1, wherein the evacuating air from the test chamber comprises drawing an unregulated vacuum.

12. The method of claim 1, wherein the trigger pressure is about 700 mbar, the target pressure is about 500 mbar, and the timer is set to about 1 second.

13. A system for testing for package leaks, the system comprising:
   a vacuum source connected to a test chamber via a conduit;
   a pressure regulator connected in the conduit between the vacuum source and the test chamber;
   a first valve connected in the conduit between the pressure regulator and the test chamber for selectively isolating the vacuum source from the conduit;
   a second valve connected in the conduit between the first valve and the test chamber for isolating the test chamber from the conduit;
   a pressure transducer connected to the conduit between the first valve and the second valve for measuring pressure in the test system;
   a microcontroller; and
   a timer, wherein the microcontroller is configured to: control the timer; initiate the timer when the pressure transducer detects a trigger pressure as the system approaches a target pressure, wherein the trigger pressure is higher than the target pressure; and
   close the first valve to isolate the vacuum source from the conduit upon expiration of the timer.

14. The system of claim 13, further comprising a third valve connected in the conduit between the first valve and the second valve for venting the system.

15. The system of claim 13, further comprising a fourth valve connected in the conduit between the vacuum source and the test chamber for bypassing the vacuum regulator.

* * * * *